Apr. 3, 1923.
F. TRINCA ET AL
1,450,765
AUTOMOBILE SIGNAL
Filed Mar. 20, 1922
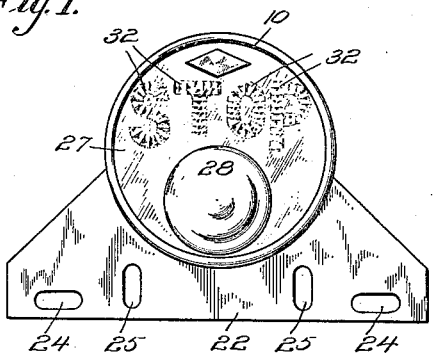
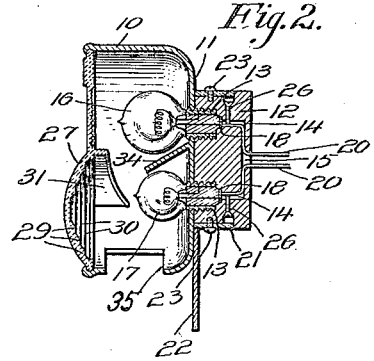
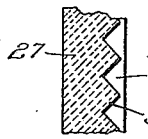
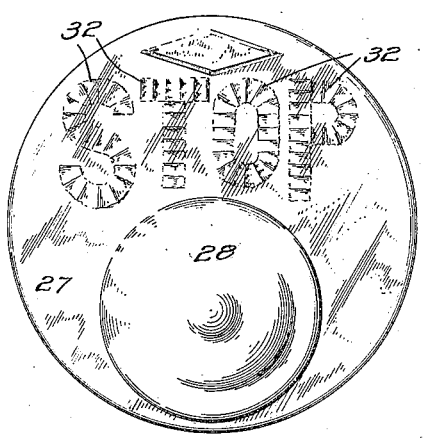
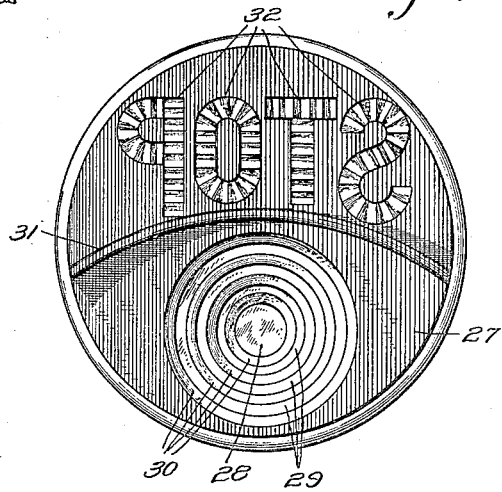
Frederick Trinca and Henry Wolf
INVENTOR.
BY
ATTORNEY.

Patented Apr. 3, 1923.

1,450,765

UNITED STATES PATENT OFFICE.

FREDERICK TRINCA AND HENRY WOLF, OF NEW YORK, N. Y., ASSIGNORS TO EVER READY AUTO SIGNAL CO., INC., OF NEW YORK, N. Y., A CORPORATION OF NEW YORK.

AUTOMOBILE SIGNAL.

Application filed March 20, 1922. Serial No. 545,342.

*To all whom it may concern:*

Be it known that we, FREDERICK TRINCA and HENRY WOLF, citizens of the United States, residing at New York, in the county of New York and State of New York, have invented certain new and useful Improvements in Automobile Signals, of which the following is a specification.

This invention relates to improvements in vehicle signals generally, and more particularly to a combined visual stop and tail light signal for motor vehicles of all classes and description.

The principal object of the invention is to provide for a signal light of the class mentioned, and one involving certain new and novel features of construction and arrangement, whereby to greatly increase divisibility of the effective portions of the signal, and to render one signalling portion thereof readily distinguishable from the other, and to otherwise prevent the lighting medium of one signal portion from affecting or interfering with the other.

Another object of the invention is to provide for a combined stop signal and tail light of the character set forth, and one embodying an extremely simple and comparatively inexpensive form of lamp housing provided with a novel form of lenses of a construction and arrangement to function both as a rear end or tail light signal and a stop light signal, and correspondingly with the operation of the light or lights encased within the housing, and a license tag supporting bracket or attaching plate depending from the housing in a manner that the numbered face of a license tag carried thereby will be properly exposed to view at all times and illuminated by the light from the rear end or tail light portion of the housing.

A further object of the invention is to provide for a signal of the type set forth, and one embodying a novel form of lens construction, made from a single disc or plate of glass or other suitable transparent material, and formed to provide a signal light emitting portion and a rear or tail light emitting portion, wherein the latter portions are contrasted one from the other, and from the main body of the lens in a manner to render the same clearly visible and distinguishable at a distance in rear of the automobile or other vehicle on which the lamp housing, with which the lens is associated, is installed.

With the foregoing and other objects in view, the invention resides in a certain novel and useful construction and arrangement as will be hereinafter more fully described, set forth in the appended claims, and illustrated in the accompanying drawing, in which:—

Figure 1 is a front elevation of a preferred embodiment of the signal in its entirety, Fig. 2 is a vertical section taken on the line 2—2 of Fig. 1, Fig. 3 is a plan view of the front face of the lens, per se, Fig. 4 is a similar view of the rear face thereof, and, Fig. 5 is an enlarged fragmentary section taken on the line 5—5 of Fig. 4.

Referring to the drawing, wherein similar characters of reference designate corresponding parts throughout the several views thereof, the numeral 10 indicates a substantially cylindrical lamp housing of sheet metal or the like, open at its front end, and closed by a flat wall portion 11 at its rear end. Supported concentrically of the rear face of the end wall 11, is a cylindrical body of insulating material 12, which is formed in its inner flat end wall, abutting the outer wall 11 of the housing, with a pair of diametrically arranged and spaced recessed openings in registry with a similarly arranged pair of openings formed in the wall 11, and the body 12 is secured in this position on the latter by tubular metal bushings 13 threaded into engagement with the walls of the registering openings thereof. Formed in the body 12 is a substantially U-shaped duct or channelway 14 having its opposite and angularly directed portions leading to and connecting the inner ends of the recessed openings, while an opening 15 is formed centrally of the outer exposed end wall of the body 12 and connects the connected portion of the duct or channelway 14 at a point medially of its opposite ends. The metal bushings 13 form sockets for the reception of the bases of a pair of electric lamps 16 and 17, which are electrically constructed to provide contacts in the side and free end walls of their faces, whereby, when positioned within the bushings or sockets 13, the side contacts will electrically ground to the walls of the bores of the latter, while the end contacts will electrically contact small contact with discs or plates 18 embedded in the inner end walls of the recessed openings in the insulated body 12, and which are in turn, electrically connected to circuit conductors 20 extending inwardly of the opening 15 of the insulating body 12, and the ducts 14 thereof. The body 12 has a major inner portion of its peripheral face formed to provide an angular groove in which is seated a metal collar 21, from which is dependingly supported a license bracket or attaching plate 22, the collar 21 being fastened to the body 12 by means of screws 23, whereby the license bracket or plate 22 is disposed immediately below the lower side of the housing 10 and extends equally to either side thereof, substantially as is shown. This bracket or plate 22 is formed inwardly of its lower edge portion with a pair of horizontally and vertically elongated slotted openings 24 and 25, respectively, for facilitating the bolting thereto of a usual form of license tag or plate (not shown). Threaded inwardly of the peripheral wall of the annular groove or channelway of the insulated body 12 are screws 26, which have their inner ends projected into the opposite legs of the duct 14 and into clamping relation with respect to the conductors 20 in position therein, and whereby to retain the latter against accidental displacement from their connection with the contacts 18.

Closing the open end of the housing 10, is a lens of glass or the like 27, which is molded to the required circular form, and to provide an outwardly bulging portion or bull's-eye 28 to one side of the center thereof, the latter constituting the lens proper to function as the rear end or tail light signal per se of the signal device as a whole. The bulging portion or bull's-eye 28 is substantially semi-spherical in form and has its outer or convexed surface smooth finished corresponding to the smooth outer surface of the lens in its entirety, while the inner or concave surface of the same is formed to provide a series of concentrically arranged annular stepped surfaces 29, each disposed in a plane parallel one to the other and similarly so with respect to the inner and outer faces of the lens proper, and are connected one to the other by inclined wall portions 30, whereby light rays from the lamp 17, located directly in front of this portion 28, within the lamp housing 10, will be concentrated on and projected directly through the flat annular surfaces 29 in the form of a series of beams of light one concentric with respect to the other, and each diffusing into the other at a distance beyond the rear or outer face of the lens 27. It is to be noted that these concentrically disposed annular plane surfaces 28 progressively increase in width outwardly from the circular plane surface at the center of the bulging or bull's-eye portion 28, whereby the desired diffusing effect of the beams of light projected therethrough is obtained, and in a manner to produce a strongly concentrated beam of light, such as will render the bulging or bull's-eye portion 28 clearly distinguishable from the remaining area of the lens in its entirety.

Immediately above the bulging or bull's-eye portion 28, of the lens 27, the inner face of the latter is formed to provide an angularly extending wall portion or partition wall, or shelf 31, which is disposed in the horizontal direction thereof, but is formed on a curved line wherein the plane of the horizontal diameter of the lens is tangent to the medial or high point of its curvature. Formed in the inner face of the portion of the lens 27, above the partition wall or shelf 31, is a signal or warning symbol or word, preferably the word "Stop," and the letters of this word are spaced in a straight line above the horizontal diameter of the lens, with the upper ends thereof disposed in a common plane, while the lower ends of the outer of the letters "S" and "P" are lengthened correspondingly with the opposite downwardly curving portions of the partition wall or shelf 31, so that all of the lower ends of the several letters are terminated in line with the curvature of the latter. Each of these letters are formed by depressions 32, of the proper configuration reading from right to left on the front or inner face of the lens 27, and the bottom or inner walls of each depression 32 is of a corrugated formation, with each corrugation 33 of a V-shaped cross section, substantially as is shown in Figs. 4 and 5. The thickness of the lens 27 is consequently reduced at these depressions 32, and by the corrugated effect of the bottom or inner walls of the latter, the light rays from the lamp 16, disposed in the rear of the upper portion of the lens, are diffused in their projection through the same, and in a manner to render the letters clearly visible and readable at a distance beyond the outer face of the lens.

With the lens positioned within the open end of the housing 10, the bulging or bull's-eye portion 28 thereof will be disposed in direct line with the lower electric lamp 17, and the "stop" signal portion thereof in direct line with the upper lamp 16, while the partition wall or shelf 31 will extend transversely of the interior of the housing 10 substantially midway between the upper and lower lamps 16 and 17, whereby to be cooperative with a horizontally disposed and forwardly inclining partition wall portion 34 formed with the rear or inner wall 11 of the housing 10. This partition wall 34 is of course disposed between the lamps 16 and 17, and its angle of inclination is such that its lower free edge is disposed in a vertical plane slightly inward of the forward end of the bulb of the lamp 17 and in the horizontal plane of the upper side of the lamp 17, or the high point of the curvature of the spherical wall thereof, whereby to prevent the light rays from this lower lamp 17 from penetrating the upper portion of the housing, and to otherwise direct the same toward the bulging or bull's-eye portion 28. The combined effect of the two partition walls 31 and 34 of the lens 27 and the housing 10, prevents any appreciable diffusion of the light rays from the upper and lower lamps 16 and 17, within the housing 10, reaching or otherwise effecting in any way the respective lens portions with which the latter are associated. It is to be noted that the upper lamp 16 is of a larger size than the lower lamp 17, and is preferably also of a greater candle power, whereby to be effective during the daylight hours, when the lower lamp 17 will not be used.

As shown in Fig. 2, the lamp housing 10 has its lower wall portion formed to provide a circumferentially elongated light aperture 35, preferably closed by a clear transparent insert (not shown), whereby light from the lower lamp 17 will be projected therethrough for the illumination at night of a license tag (not shown) dependingly supported from the tag bracket or plate 22.

To render the signalling or light emitting portions of the lens 27 effective to a maximum degree, and to further the contrast between the same and the remaining portions of the lens, the inner faces of the no-light emitting portions as well as the entire surface of the partition wall or shelf 31 is coated with an opaque pigment, whereby to render the no-light emitting portions practically impervious to the light rays from the lamp 16 and 17, so that substantially all of the rays are directed through the light emitting portions of the lens.

From the foregoing, it will be readily apparent that, while a preferred embodiment of the signal lamp has been described and illustrated herein in specific terms and details of construction and arrangement, various changes in and modifications of the same may be resorted to without departing from the spirit of the invention, and the scope of the claims appended hereto.

Having thus fully described the invention, what we claim is:—

1. As an article of manufacture, a signal lens comprising a circular disc of glass forming a lens body, a light emitting outwardly bulging portion formed in said body to one side of the horizontal diameter thereof and constituting a rear end signal for automobiles, a light emitting signal portion formed in said body at the other side of the horizontal diameter thereof and constituting a stop signal of a formation distinctive from the said bulging portion, an angularly disposed and rearwardly extending shelf integral with the rear face of said body and between the light emitting portions thereof, a coating applied to the inner face of the portions of said body surrounding the light emitting portions thereof and to said shelf, whereby to render the same impervious to the passage of light rays therethrough, and lamps associated with said light emitting portions.

2. In a combined stop signal and rear light for automobiles, the combination with a lamp housing having electric lamps arranged therein one above the other, of a lens body closing the open side of the lamp housing and having light emitting portions formed thereon one complemental to each of said lamps and contrasting with respect to the surrounding portions of the body, and a pair of cooperative oppositely extending and downwardly disposed partition walls one formed on the inner wall of said housing and the other on the inner face of said lens body said walls disposed between said lamps whereby to admit of each signal being affected only by the light rays from the lamp complemental thereto.

3. In a signal, a lens body having a pair of signal portions each provided with a light emitting part and the remaining part thereof opaque, and said lens body further having as an inherent part thereof, means projecting rearwardly therefrom and providing an angularly extending and curved opaque element, and a lamp associated with each of said portions and said means.

4. In a signal, a lens body formed with an inherent bull's-eye portion and a signal portion, said bull's-eye and signal portions forming light emitting parts, said lens having that part thereof other than the light emitting parts opaque, and said lens body having formed integral with its inner face, an angularly extending and curved opaque shelf interposed between and separating said portions and a lamp associated with each of said portions.

In testimony whereof, we affix our signatures hereto.

FREDERICK TRINCA.
HENRY WOLF.